(12) United States Patent
Ronneke et al.

(10) Patent No.: US 10,306,552 B2
(45) Date of Patent: May 28, 2019

(54) COORDINATION USING THE UE APPLICATION

(71) Applicant: Telefonaktiebolaget L M Ericsson (publ), Stockholm (SE)

(72) Inventors: Hans Bertil Ronneke, Kungsbacka (SE); Peter Hedman, Helsingborg (SE); Paul Schliwa-Bertling, Ljungsbro (SE)

(73) Assignee: TELEFONAKTIEBOLAGET LM ERICSSON (publ), Stocholm (SE)

( * ) Notice: Subject to any disclaimer, the term of this patent is extended or adjusted under 35 U.S.C. 154(b) by 242 days.

(21) Appl. No.: 14/993,072

(22) Filed: Jan. 11, 2016

(65) Prior Publication Data
US 2016/0205622 A1 Jul. 14, 2016

Related U.S. Application Data

(60) Provisional application No. 62/102,773, filed on Jan. 13, 2015.

(51) Int. Cl.
*H04W 52/02* (2009.01)

(52) U.S. Cl.
CPC ... *H04W 52/0203* (2013.01); *H04W 52/0216* (2013.01); *Y02D 70/00* (2018.01); *Y02D 70/1224* (2018.01); *Y02D 70/1226* (2018.01); *Y02D 70/1242* (2018.01);
(Continued)

(58) Field of Classification Search
CPC ..... H04W 4/005; H04W 76/048; H04W 8/04; H04W 8/24; Y02B 60/50
See application file for complete search history.

(56) References Cited

U.S. PATENT DOCUMENTS

| 2009/0093281 A1* | 4/2009 | Demirhan | H04W 52/0235 |
| | | | 455/574 |
| 2014/0226542 A1 | 8/2014 | Gupta et al. | |
| 2016/0286385 A1* | 9/2016 | Ryu | H04W 68/02 |

OTHER PUBLICATIONS

3GPP TR 23.709 V02.0, Nov. 2014, 3rd Generation Partnership Project; Technical Specification Group Services and System Aspects; Study on Optimizations to Support High Latency Communications; Stage 2 (Release 13), chapter 4.2, 4.2.1 and 4.2.2, 5 pages.

(Continued)

*Primary Examiner* — Mansour Oveissi
(74) *Attorney, Agent, or Firm* — Laffler Intellectual Property Law, PLLC (57) ABSTRACT

The present invention relates to methods and arrangements in cellular/wireless mobile communication systems, in particular for handling latency issues in a wireless network and power saving features in user equipment. This is provided in methods and nodes for handling communication in a wireless communication network. The solution involves receiving from a user equipment (UE) an indication of maximum acceptable response time for an application, setting relevant Mobility Management Entity/Serving GPRS Support Node (MME/SGSN) parameters and timers accordingly, where the parameters/timers are set in such a way that the maximum response time is not exceeded if power saving functions are active, and sending from the node an instruction to the UE about which power saving function(s) the UE preferably should use.

15 Claims, 5 Drawing Sheets

(52) U.S. Cl.
CPC ........ *Y02D 70/1262* (2018.01); *Y02D 70/164* (2018.01); *Y02D 70/21* (2018.01); *Y02D 70/24* (2018.01)

(56) References Cited

OTHER PUBLICATIONS

3GPP TR 23.887 V12.0.0 (Dec. 2013), 3rd Generation Partnership Project; Technical Specification Group Services and System Aspects; Study on Machine-Type Communications (MTC) and other mobile data applications communications enhancements (Release 12), chapter 7.1.3.1, 11 pages.
PCT International Search Report, dated Apr. 25, 2016, in connection with International Application No. PCT/EP2016/050365, all pages.
PCT Written Opinion, dated Apr. 25, 2016, in connection with International Application No. PCT/EP2016/050365, all pages.
3GPP TS 24.301 version 10.15.0 Release 10, Universal Mobile Telecommunications System (UMTS); LTE; Non-Access-Stratum (NAS) protocol for Evolved Packet System (EPS); Stage 3, (Oct. 2014), part 1, 157 pages.
3GPP TS 24.301 version 10.15.0 Release 10, Universal Mobile Telecommunications System (UMTS); LTE; Non-Access-Stratum (NAS) protocol for Evolved Packet System (EPS); Stage 3, (Oct. 2014), part 2, 158 pages.
3GPP TS 22.368 version 10.5.0 Release 10, Digital cellular telecommunications system (Phase 2+); Universal Mobile Telecommunications System (UMTS); LTE; Service requirements for Machine-Type Communications (MTC); Stage 1, (Jul. 2011), 18 pages.
3GPP TR 23.709 V02.0 (Nov. 2014), 3rd Generation Partnership Project; Technical Specification Group Services and System Aspects; Study on Optimizations to Support High Latency Communications; Stage 2 (Release 13), 13 pages.

* cited by examiner

COORDINATION USING THE UE APPLICATION

CROSS-REFERENCE TO RELATED APPLICATIONS

This application claims the benefit of U.S. Provisional Application No. 62/102,773, filed Jan. 13, 2015, which is hereby incorporated herein by reference in its entirety.

TECHNICAL FIELD

The present invention relates to methods and arrangements in cellular mobile communication systems, in particular in relation to synchronization and latency issues, for example when coordinating Machine type communications (MTC) operations.

BACKGROUND

In order to enhance battery life time for example user equipment (UE), terminals and other battery operated devices with wireless communication capabilities, different power saving solutions are implemented in these devices. Also with an increasing demand on reducing energy consumption in general, even when devices are connected to external power supply this is of importance. For simplicity the different devices above will be referred to as UEs.

Considering situations such as Internet of Things (IoT), Machine to machine (M2M) communication, sensor networks, high number of smart phones connected, and so on, the demand for suitable power management is important.

For example in smart phones many different types of applications are running each with its own power demands and connectivity demand setting up a complex power management situation.

Another example is the use of network connected sensor(s) that usually are supposed to work standalone for some application for long periods of time and one major cost issue for these solutions is exchanging batteries of the sensors. In this case it is crucial to find an optimal power consumption model.

In order to not impact the current infrastructure setup too much care needs to be taken to not disrupt or change the already available architectures, be it at the radio access network (RAN) side or the core network side as well as at the UE side.

One current solution for power management is related to maximum DRX cycles in idle mode which are possibly extended using longer values, thus allowing the UE to reduce power consumption and save battery by prolonging the periods between having to wake up and listen for potential paging messages or other control traffic. Wake up periods are major power consumption events.

Extended Discontinuous Reception (DRX) cycles are enabled in UTRAN/E-UTRAN by providing parameters for extended DRX in non-access stratum (NAS). For example, the current DRX parameters from UE to network in clause 10.5.5.6 of 3GPP TS 24.008 are extended in a backward compatible way to ensure that normal UE(s), i.e. UEs not requiring low power consumption, are not impacted. For enabling the extended DRX cycle in UTRAN/E-UTRAN there are 2 options:

(option A) on one hand an eNodeB (eNB) may broadcast the default extended DRX cycle value via system information messages to indicate network capability of supporting extended DRX, on the other hand UE should inform the network about its desire to use extended DRX by an explicit indicator and its expected specific extended DRX cycle value if necessary;

(option B) the UE may inform the network about its desire to use extended DRX by including a preferred extended DRX cycle value.

In this extended DRX procedure, the availability of extended DRX for the UE is decided in consideration of the UE's capability, the network condition (e.g., ISR activation), as well as the support of extended DRX of the different RAN nodes within an area served by the core network node (e.g., tracking areas (TAs) or mobility management entity (MME) pool area). This is because the UE can travel through several RAN nodes without performing location updates, for example in some situations some RAN nodes may not support the extended DRX solution: e.g. legacy E-UTRAN nodes in TA or legacy UTRAN nodes in an ISR activated case.

For example:

(option A) If UE moves to a new cell in a new TA and does not receive the extended DRX cycle value in system information, it knows the new cell/TA cannot support the extended DRX.

(option B) If UE moves to a new cell in a new TA and does not receive the extended DRX in the TA update (TAU) accept, it knows the TA or at least one cell within the TA cannot support the extended DRX. The UE will then only use the normal DRX cycle.

The value of the default extended DRX cycle applied in RAN nodes may be informed to the MME using several different methods, for example using S1/Iu signalling, OA&M method, or manual configuration.

For E-UTRAN, the MME needs to indicate to the eNB the UE's desire to use extended DRX cycle in the S1AP Paging message. (option A) If the received UE specific extended DRX value from UE is less than the default extended DRX value, the MME should also include the UE specific extended DRX value in the paging message. When MME initiates the paging procedure it determines which paging parameters to send to eNBs since it knows the eNBs' capability and the UE desire.

(option A) The MME sends paging to the eNB supporting longer DRX with UE desire indication and the UE specific longer DRX if necessary.

(option B) The MME includes the extended DRX value that is stored in the context for this UE.

After the UE determines that the extended DRX value is supported, the UE ignores the default normal DRX value broadcasted in the system information.

(Option A)

The eNB and UE both use the smaller one of the UE specific extended DRX value and a default extended DRX value broadcast in system information for paging monitoring.

(Option B)

The eNB and UE both use the extended DRX value provided by the MME as described above.

Paging re-transmission timers in the MSC/SGSN/MME should be adapted to fit in the needs of the extended DRX cycle and normal DRX cycle.

The used DRX value needs to be known by the UE, RAN and MME/SGSN.

Different application layer protocols used within the M2M ecosystem have different requirements and characteristics with respect to acceptable end-to-end delay, round trip time, persistence in retransmissions, etc. For instance, different machine type communication (MTC) applications have different maximum latency requirements.

For some cases it may be beneficial to handle the high latency of power saving devices on the application level by waiting with the transmission until the device becomes active. If the application can be notified when a device becomes active and can be reached over the IP connectivity, the application can start a packet transmission in the "active window", make the communication with the device without delay and finalize the subsequent application processing promptly. This would allow a simple application logic, no or a minimum number of retransmissions, minimized load on the network and the radio interface, minimum energy consumption in the device and also a minimum of required processing at the sending side, i.e. a Service Capability Server or Application Server (SCS/AS).

This approach for handling the high latency of devices is not in conflict with an optimization of downlink (DL) transmission to power saving devices by buffering, but they work well together as complementary approaches. In fact, buffering may even be a prerequisite when extreme synchronization is required e.g. when Extended DRX is used for power saving.

Devices that are difficult to reach that use power saving functions is an issue that could make cellular radio communication a less preferred choice, in for example Internet-of-Things and/or MTC applications. The 3GPP based power saving functions is designed for a maximum energy saving in constrained devices. Hence the power saving period may, depending on application, be quite long, e.g. several minutes or hours. The standard transport protocol's retransmission schemes are not designed to handle such long response times and will therefore not help for reaching the device.

A specific case of difficulty reaching devices that use power saving functions is when the sending application server is not using Tsp interface or other SMS interface, i.e. device triggers cannot be sent. In those cases, network initiated communication with devices may not be possible at all e.g. if the active time is short and the power saving intervals long.

Devices minimize power consumption by using short active windows and long power saving intervals. Applications that transmit IP data to the UE may experience frequent transmission failures. The tasks of the application can take a long time or fail to finalize and the application needs to be tolerant of potentially very long processing times and increased failure rates.

SUMMARY

It is an object to obviate at least some of the above disadvantages and provide improved node(s) and method(s) for wireless telecommunication networks.

One object of the present invention is to provide system enhancements to support applications that communicate with devices that are not reachable for a long period over the 3GPP IP connectivity and being able to support large number of such devices in the system without negatively affecting the system performance.

This is provided in a number of aspects, wherein a first aspect is an infrastructure node for handling communication in a wireless communication network. The infrastructure node may comprise a processing unit, a storage unit, and a communications unit. The processing unit is arranged to execute instructions sets stored in the storage unit for receiving from a user equipment (UE) an indication of maximum acceptable response time for an application. Relevant Mobility Management Entity/Serving GPRS Support Node (MME/SGSN) parameters and timers are set accordingly, where the parameters/timers are set in such a way that the maximum response time is not exceeded if power saving functions are active. An instruction is sent from the node to the UE about which power saving function(s) the UE preferably should use.

In some embodiments, in the infrastructure node, indication of maximum acceptable response time for an application is included in an EPS/GPRS Mobility management, EMM/GMM, Non-Access Stratum, NAS, request.

If the UE is to use power saving mode, PSM, the extended periodic timer parameter is used to convey the maximum response time or if the UE is to use enhanced UE Discontinuous Reception, eDRX, the eDRX parameter is used for conveying the maximum response time.

The parameter for maximum response time is available in at least one of Attach request, Non-Access Stratum. NAS, response, or in Tracking/Routing Area Update, TAU/RAU, requests.

The MMW/SGSN timers are set as a multiplicity factor of the default periodic RAU/TAU timer. For example the factor may be 1.5.

The infrastructure node is supporting machine type communication (MTC).

Furthermore, if the UE is to use enhanced UE Discontinuous Reception, eDRX, a paging request is sent from the MME/SGSN to a network interface node.

In a further embodiment, there is provided a method in an infrastructure node, in a wireless communication network, for handling power save functionality, the method comprising steps of receiving from a user equipment an indication of maximum acceptable response time for an application, setting relevant Mobility management entity/Serving GPRS support node, MME/SGSN, parameters and timers accordingly, transmitting an instruction to the UE with information about which power saving function(s) to be used, and wherein the parameters/timers are set in such a way that the maximum response time is not exceeded if power saving functions are active.

In some embodiments, the indication of maximum acceptable response time for an application is included in an EPS/GPRS Mobility management, EMM/GMM, Non-Access Stratum, NAS, request.

If the UE is to use power saving mode, PSM, the extended periodic timer parameter is used to convey the maximum response time.

If the UE is to use enhanced UE Discontinuous Reception, eDRX, the eDRX parameter is used for conveying the maximum response time. The method may further comprise a step of sending a paging request from the MME/SGSN to a network interface node.

The parameter for maximum response time is available in at least one of Attach request, Non-Access Stratum. NAS, response, or in Tracking/Routing Area Update, TAU/RAU, requests.

Yet another embodiment is shown: a user equipment (UE) device in a wireless communication network. The UE may comprise a processing unit, a storage unit, and a communication unit. The UE is arranged to operate in the processing unit instruction sets stored in the storage unit for transmitting and receiving data and control traffic using the communication unit and further arranged to receive via the communication unit an indication from an application server (125) related to maximum acceptable response time. The UE is further arranged to transmit via the communication unit an indication of the maximum acceptable response time to an infrastructure node. Also the UE is arranged to receive, via the communication unit, from the infrastructure node an indication of what type of power save function to use in relation to the maximum acceptable response time, and is arranged to use the indicated type of power save function in the UE.

The processing unit may further comprise a synchronizing module for synchronizing maximum acceptable response time and power save functions with the infrastructure node, a power saving module for handling power save functions, and an operation module for handling of application operations.

In some embodiments, the UE supports machine type communication, MTC.

There is also provided a method performed in the user equipment (UE) device in the wireless communication network. The method comprises steps of receiving an indication, from an application server, related to maximum acceptable response time, transmitting an indication of the maximum acceptable response time to an infrastructure node, receiving from the infrastructure node an indication of what type of power save function to use in relation to the maximum acceptable response time and using the indicated type of power save function.

In some embodiments, the indication of maximum acceptable response time for an application is transmitted using an EPS/GPRS Mobility management, EMM/GMM, Non-Access Stratum, NAS, request when transmitting to the infrastructure node.

The embodiments of the present invention provide methods and nodes, improving the efficiency of network utilization and increase battery life of user equipment/devices connected to the network. With the power saving function(s) in wireless devices synchronized with the network operation less information packets will be lost due to latency issues and/or dropping of packets in the network. One further apparent advantage is that the network and/or network operator will be provided with better control on power save modes of the devices connected to the network in relation to specific network setup.

Further advantages of the invention will appear from the following detailed description of the invention.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Figure 1:
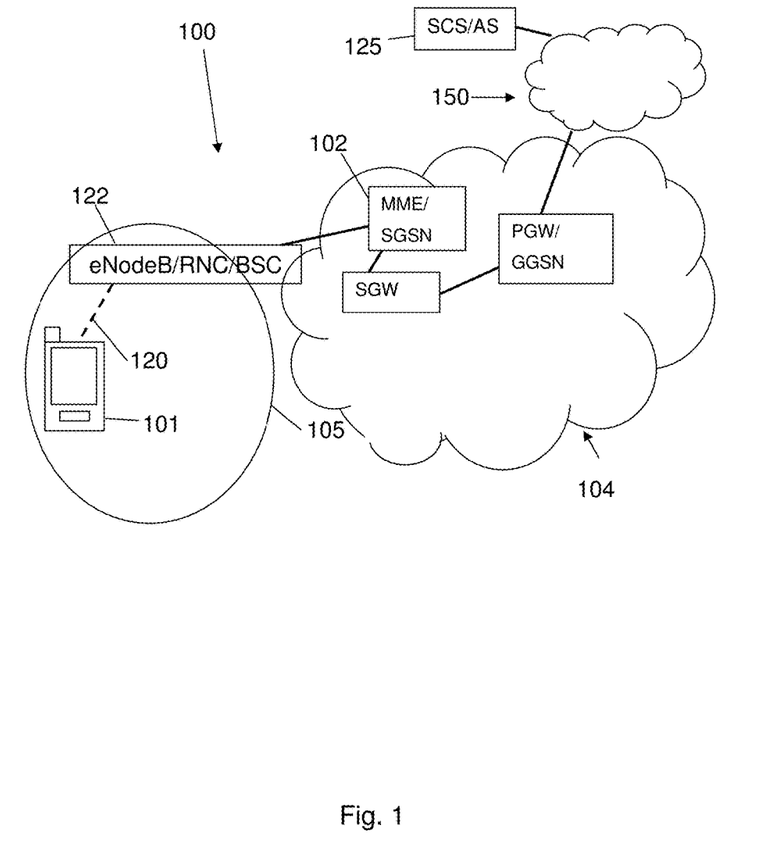
FIG. 1 is a schematic block diagram illustrating an example network according to the present invention.

In FIG. 1 reference numeral 100 indicates a cellular, optionally packet based, telecommunications infrastructure network according to a first embodiment of the invention. A user equipment (UE) 101, such as a terminal, mobile/cellular phone, smart phone, pocket digital assistant (PDA), tablet computer, laptop, personal computer, or any other device capable of wireless communication, e.g. non-user related equipment such as devices in machine-to-machine communication, communicates via a wireless communication link 120 with a radio access device/network node, e.g. an eNodeB (eNodeB) 102, NodeB, Base station, or similar network infrastructure access device, which in turn communicate with a core network (104) handling charging, authentication, and connection to other communication devices and/or application services such as for instance Internet based services. The wireless communication link 120 may for example be based on a Long Term Evolution (LTE) or similar cellular based communications network standard as for instance WCDMA, GPRS, and EDGE.

Figure 2A:
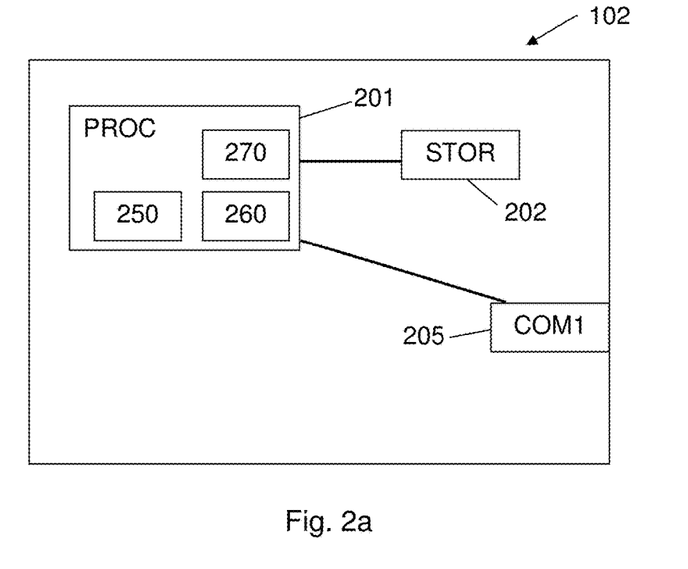
FIGS. 2a, b are schematic block diagrams illustrating exemplary devices according to the present invention wherein 2a is an infrastructure node and 2b is a UE/terminal/device node.

The network node, e.g. MME, 102 comprises as is shown in FIG. 2, at least one processing unit 201 (PROC), and optionally one or more computer readable memory units 202 (STOR) connected to the processing unit. Furthermore, the eNodeB also comprises a data communications interface (205) for communicating with the core network (104) nodes and the eNodeB/RNC/BSC. The processing unit is arranged to receive and transmit control and/or data packets using communications interface. The processing unit is arranged to control data flow and operations according to the present invention within the MME between the memory and the communication interface and within the processing unit itself depending on functionality operated. The communication interface may comprise for instance an Ethernet interface or an asynchronous transfer mode (ATM) interface. The processing unit may comprise for instance a microprocessor, an application specific integrated circuit (ASIC), a digital signal processor (DSP), or a field programmable gate array (FPGA). The memory unit may comprise any suitable volatile and/or non-volatile memory in a single unit or as a combination of units, the memory may comprise for instance a solid state memory, e.g. SSD, a random access memory (RAM) of any type, a hard disk (HD), and so on. In case the processing unit is arranged to operate instructions sets, such as the case of the processing unit being for instance a microprocessor or DSP, the processing unit may then be arranged to operate instruction sets stored as software in the computer readable memory unit.

Figure 2B:
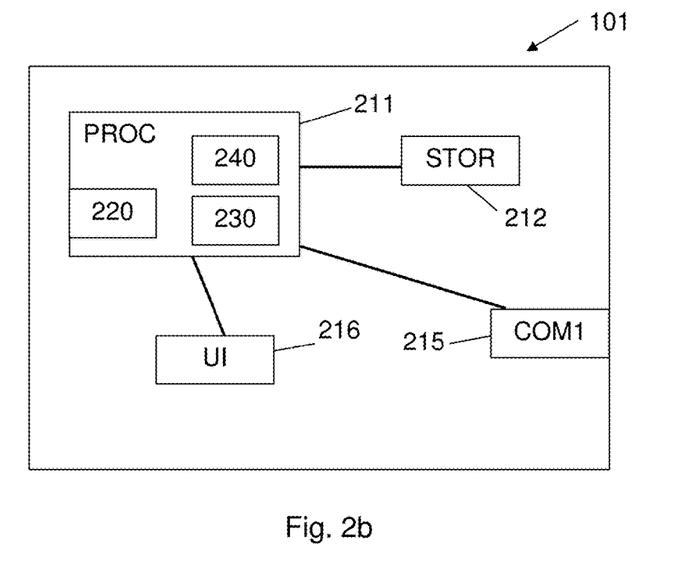

With reference to FIG. 2b, the UE also comprise a processing unit 211 arranged to operate instruction sets, stored in a memory 212, for handling an optional user interface (UI) 216, and communicating wirelessly with a network node or other UEs via a communication interface module 215. The examples used for processing device and memory in relation to MME are also applicable for the UE. The communication interface may be a suitable wireless radio technology such as for instance LTE based but also WCDMA, UTRA FDD, UTRA TDD, GSM/GERAN/EDGE, or similar. The processing unit may comprise a synchronizing module 220, a power saving module 230, and an operating module 240 for handling the procedures of the UE. The power saving module is handling the decisions to set the UE in power save and monitor the continuous behaviour in relation to this, e.g. when to leave the power save mode.

The processing unit of the network node 102 may in a similar manner comprise a synchronization module (250), a handling module (260) and a transmission module (270) for transmitting acquired and determined parameters to core network nodes (e.g. SGW and/or PGW), a network interface node (e.g. eNodeB/RNC/BSC), and/or a UE or a combination of these.

The invention comprises embodiments, which can be implemented in a network node and a UE. The network node herein can be the MME/SGSN and/or the SGW. The methods may be implemented as software arranged to execute as instructions sets in the processing units and stored in the memory or computer readable storage unit of the node(s) involved.

The solution in the present invention relates to Scenario B "Coordination of maximum latency between the application and the network" (clause 4.2 in [1]). Of particular interest is coordination using UE application.

For 3GPP devices that use power saving functions, the 3GPP network will instruct the device to power down their radio functions as soon as there is a pause in the communication, e.g. a period of time after the device has moved to ECM-IDLE. The devices will power on their radio functions periodically to synchronize with the 3GPP network e.g. for sending their periodic Traffic Area Update/Routing Area Update (TAU/RAU) update, listening to the paging channel or just sending uplink data. The result of this behaviour is that if data is sent to such a device, it will take some time before the device can respond, given that the data is buffered in the network (see clause 5.2 in [1]).

The operation will now be discussed in detail with reference to FIG. 3.

Application Servers (AS), which need to initiate data transmissions to devices that are applying power saving functions, may control the maximum latency for downlink data to the device by applying the procedure described below. When it is possible and sufficient to configure the maximum response time in the devices themselves, steps 1 to 3 in FIG. 3 may be omitted.

Figure 3:
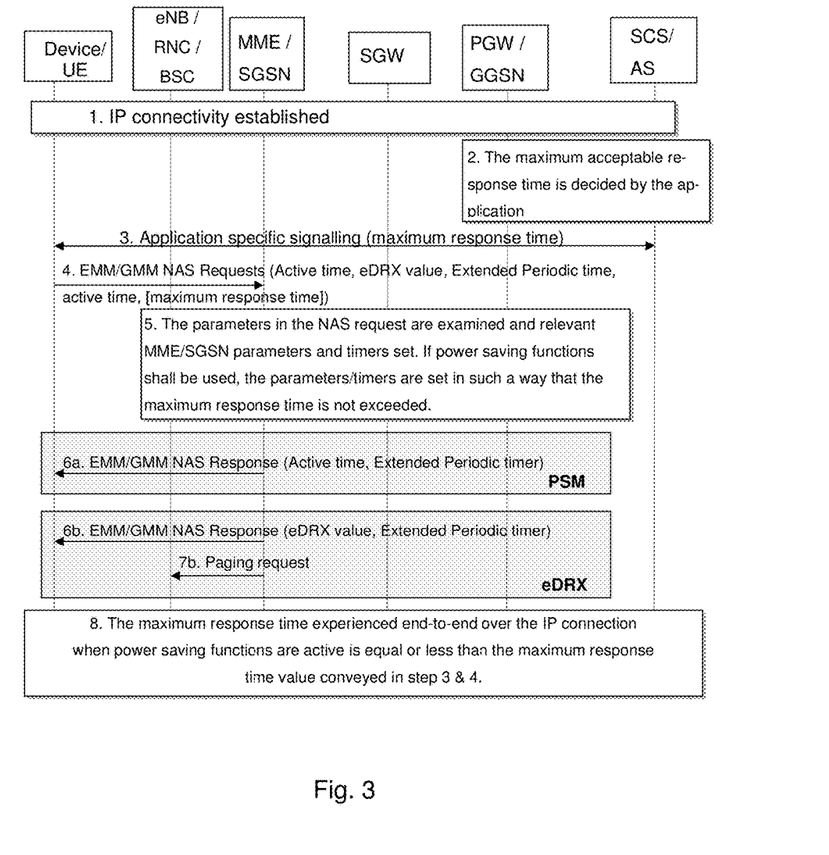
FIG. 3 is a schematic block diagram illustrating an exemplary signalling flow according to the present invention.

The "maximum response time" in the FIG. 3 is "maximum latency" discussed in this document. It is the delay an application may experience for the initial downlink IP packet after a pause in packet transmissions where a power saving function has become active for the 3GPP IP connection.

1-3. A services capability server (SCS) or an application server (AS), hereafter denoted as SCS/AS, has Internet Protocol (IP) connectivity with a device. The SCS/AS knows the maximum acceptable response time for the application and communicates this value to the application in the device using application specific signalling. In case the value is already known in the device by other means e.g. pre-configuration, this procedure may also start at step 4.

4. The UE/device sends an EPS mobility management/ GPRS mobility management (EMM/GMM) Non-Access Stratum (NAS) request to a mobility management entity/ Serving GPRS Support Node (MME/SGSN) with possible parameters such as Discontinuous Reception (DRX), periodic time and active time (Active time, eDRX value, Extended Periodic time, active time, [maximum response time]). The device may ensure that the parameters DRX and periodic time doesn't exceed the 'maximum response time', or it may pass a specific parameter for 'max response time' for the MME/SGSN to ensure this. In one exemplary implementation the device in addition comprises in the request a new parameter 'maximum response time' (or 'maximum delay' or 'maximum latency' etc) to inform the network about the maximum acceptable response time decided by the application. Other parameters that may be used are local UE configurations or operator policies.

5. The MME/SGSN checks the received time values and sets relevant MME/SGSN timers based on the received time values, operator policies, and network configuration. The network decides which power saving function(s) to use (out of a multitude of possible power saving functions) based on parameters provided by the device. The network then communicates to the device which power saving function(s) to be used by the device. If there is a conflict between requested parameters and operator policies or network configuration, the MME/SGSN may negotiate values or switch power saving functions.

That power saving may be enabled for the device is given either implicitly or explicitly from the parameters received from the device, or retrieved from pre-configuration in the network. The pre-configuration in the network may be in a Home Subscriber Server (HSS) based subscription information, or in MME/SGSN configuration (e.g. International Mobile Subscriber Identity (IMSI) ranges, International Mobile station Equipment Identities/Type Allocation Code (IMEI/TAC) code, Access Point Name (APN), etc.), or a configuration retrieved from some other network node.

The MME/SGSN decides which power saving function (i.e. Power Saving Mode, or Extended long idle DRX) based input parameters received from the device in step 4 and other information available or retrieved by the MME/SGSN. A decision to use the one or the other could e.g. depend on the network dimensioning and the setting of the periodic TAU/ RAU timer and thus may vary between networks.

Alternatively the MME/SGSN can base a decision of which power saving function(s) to be used on a separate parameter 'maximum response time' (or 'maximum latency', 'maximum delay', etc.) and the device power saving capabilities of the UE (sent by the UE to the MME/SGSN). The device power saving capabilities can be explicit parameters for the method e.g. parameters in the EMM/GMM NAS request message or implicit by other parameters specified by the device e.g. 'Active time', an 'eDRX value', etc. Optionally there is also a parameter by which the device commands or requests the network to activate power saving for the device.

One example of how the network decides which power saving function to use, Power Saving Mode (PSM) or Extended long idle mode DRX (eDRX), is by comparing the maximum response time with a breakpoint value calculated or pre-configured in the MME/SGSN or the Core Network. If calculated it can e.g be a factor of the default periodic RAU/TAU timer ("T3312 extended value" according to 3GPP TS 24.008). For example if the periodic RAU/TAU timer is 20 min the breakpoint value can be 1.5*20 min=30 min. Power saving method would be decided to be eDRX if 0<maximum response time<30 min and to be PSM for 30 min<maximum response time<many days. However, other factors than 1.5 may be used depending on the application setup. The breakpoint value may also be calculated from a deeper energy analysis related to the different power saving functions in the device (e.g. energy required for periodic reading of the paging channel versus periodic transmission of periodic TAU/RAU messages). The device characteristics may in one implementation be based on the IMEI of the device i.e. per device type the threshold is set differently. Alternatively, if too complex, it could be based on assumed platforms used e.g. values from most common platforms used on the market, i.e. depending on different operating systems or hardware platforms.

6. The MME/SGSN returns an EMM/GMM NAS Response message to an EMM/GMM NAS Request message to the UE/Device. Parameters in the response message are set in the response message based on which power saving function the MME/SGSN decided the UE may use/implement. For example if the MME/SGSN has decided to use eDRX for power saving, the response parameters relevant to eDRX are set based on the 'maximum response time, but PSM is disabled and relevant parameters for PSM are set accordingly (e.g. Periodic RAU/TAU time=default periodic RAU/TAU time). The MME/SGSN decision regarding which power saving method the device shall use may be explicit using a specific parameter or it may be implicit based on how PSM and eDRX parameters are set and which may be interpreted by the UE.

6a. In case PSM is used, the negotiated Active time and Extended Periodic Timer are returned in a NAS response from the MME/SGSN to the UE. The parameters are set not to exceed the maximum response time. Potentially also a DRX value is returned. (parameters e.g.: eDRX value, Extended Periodic time).

6b. In case eDRX is used, potentially the negotiated DRX value and Periodic timer are returned in the NAS response from the MME/SGSN to the UE, depending on the result of the eDRX study. The parameters are set not to exceed the maximum response time. (parameters are e.g.: eDRX value, Extended Periodic time).

7b. In case eDRX is used, any Paging request message is sent from the MME/SGSN to the eNB/RNC/BSC based on the negotiated DRX value.

8. The end-to-end experience should be that any (initial) machine type (MT) data does not exceed the maximum response time conveyed in step 3 & 4. The maximum response time experienced end-to-end over the IP connection when power saving functions are active is equal or less than the maximum response time value conveyed in step 3 & 4.

Application Servers, which need to initiate data transmissions to devices that are based on 3GPP technology and are applying power saving functions to reduce the energy consumption in the device, should preferably follow the recommendations below. These steps are advantageous for cellular IoT applications.

For 3GPP devices that use power saving functions, the 3GPP network will instruct the devices to power down their radio functions as soon as there is a pause in the communication. The devices will however power on their radio functions periodically to synchronize with the 3GPP network. The result of this behaviour is that if data is sent to such a device, it will take some time before the device can respond, i.e. until the next synchronization occurs. It is possible for application servers to control this maximum response time. Application servers that wish to do this should follow a procedure as described by steps 1 to 5 below and related to FIG. 4 and FIG. 5.

Figure 4:
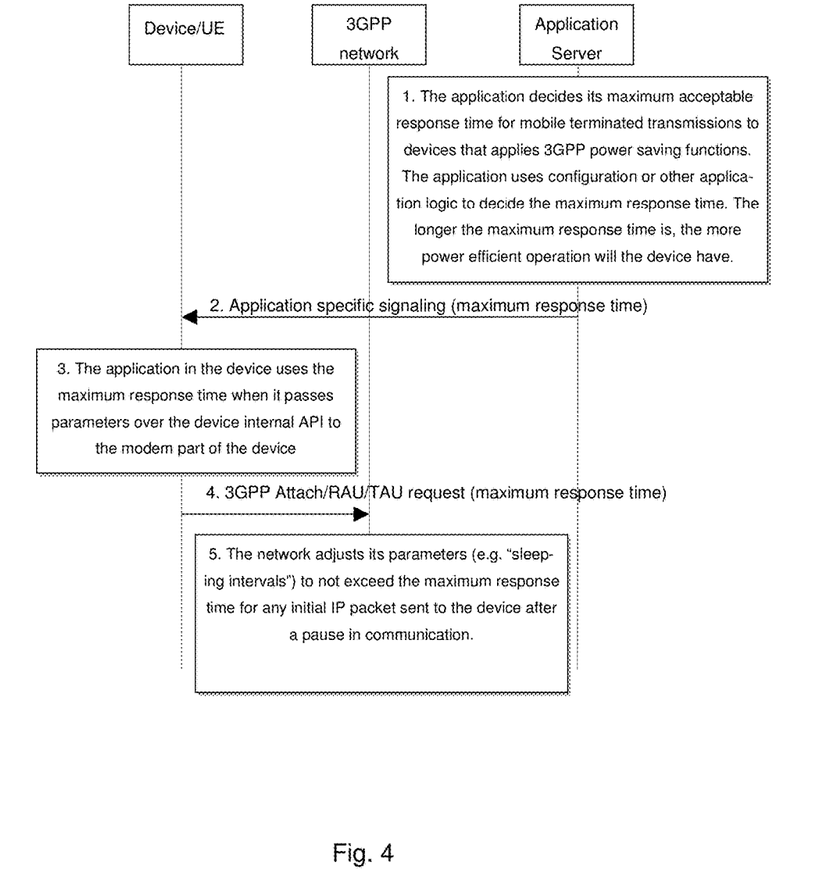
FIG. 4 is a schematic for exemplary signalling flow according to the present invention.
Figure 5:
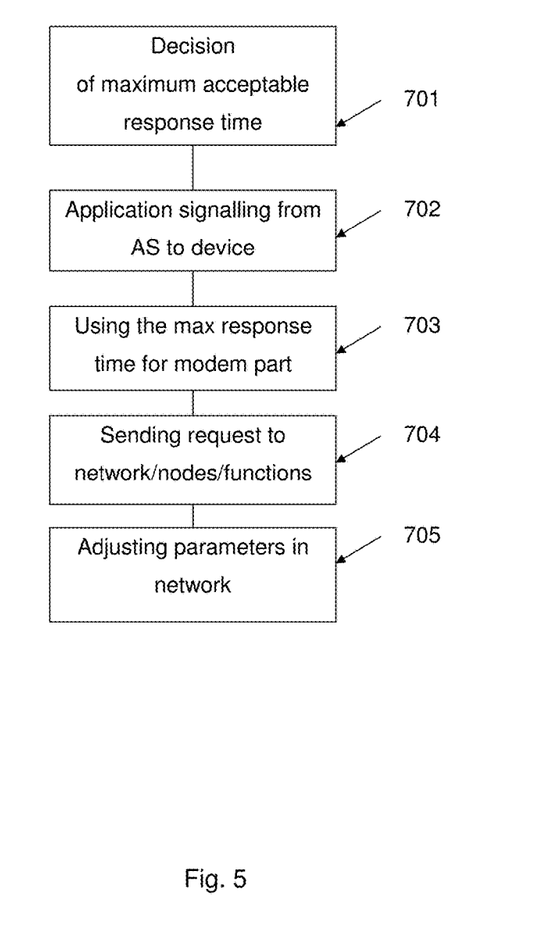
FIG. 5 illustrates schematically a method according to the present invention.

When it is possible and sufficient to configure the maximum response time in the devices themselves, only steps 3 to 5 needs to be followed.

A detailed look at the method is shown below with references to FIGS. 4 and 5:

Step 1 (701): The application decides its maximum acceptable response time for mobile terminated transmissions to devices that applies 3GPP power saving functions. The application uses configuration or other application logic to decide the maximum response time. The longer the maximum response time is the more power efficient operation the device will have.

Step 2 (702): Application specific signalling (maximum response time) from application server to device. The type of signalling is dependent on the application and what is to be communicated.

Step 3 (703): The application in the device uses the maximum response time for the application when it passes parameters over the device internal application programming interface (API) to the modem part of the device. Furthermore, the device may use local UE configuration, operator policies, network configuration.

Step 4 (704): 3GPP Attach/RAU/TAU request (maximum response time) message is sent from the device to the 3GPP network and appropriate functions/nodes in the network.

Step 5 (705): The network adjusts its parameters (e.g. "sleeping intervals") to not exceed the maximum response time for any initial IP packet sent to the device after a pause in communication.

It is possible to set parameters in the 3GPP network for the different power saving mechanisms in order to obtain a specific maximum latency characteristic of the IP connection. Applications having a maximum latency requirement are expected to inform the network about their requirement. Applications may also inform the 3GPP network about a change of the current maximum latency requirement, e.g. due to a changed application state or changed conditions. The overall goal with informing the network of the maximum latency requirement is to minimize total power consumption in the device.

The maximum latency requirement is highly application dependent. For example, for a device that measures and controls a water flow, a response time (i.e. maximum latency) of 1 hour may be sufficient for increasing or reducing the water flow. For another device that measures and controls a gas flow, a response time of 1 minute may for example be required in order to switch off the gas in case of emergency. This maximum latency requirement the application has may be communicated to the network. The network uses this maximum latency information to set parameters correctly for the different affected mechanisms e.g. the PSM.

The present solution makes it possible for applications to set the maximum acceptable response time it will experience when the 3GPP system applies power saving functions such as Power Saving Mode (PSM) or eDRX. The solution is applicable to both the terminal and MME/SGSN side for M2M/Internet-of-Things communication issues.

The solutions take the form of for instance in one embodiment as an infrastructure node for handling communication in a wireless communication network. The infrastructure node may comprise a processing unit, a storage unit, and a communications unit. The processing unit is arranged to execute instructions sets stored in the storage unit for receiving from a user equipment (UE) an indication of maximum acceptable response time for an application; setting relevant Mobility Management Entity/Serving GPRS Support Node (MME/SGSN) parameters and timers accordingly, where the parameters/timers are set in such a way that the maximum response time is not exceeded if power saving functions are active; and sending from the node an instruction to the UE about which power saving function(s) the UE preferably should use.

Furthermore in some embodiments, in the infrastructure node indication of maximum acceptable response time for an application is included in an EPS/GPRS Mobility management, EMM/GMM, Non-Access Stratum, NAS, request.

If the UE is to use power saving mode, PSM, the extended periodic timer parameter is used to convey the maximum response time or if the UE is to use enhanced UE Discontinuous Reception, eDRX, the eDRX parameter is used for conveying the maximum response time.

The parameter for maximum response time is available in at least one of Attach request, Non-Access Stratum. NAS, response, or in Tracking/Routing Area Update, TAU/RAU, requests.

The MMW/SGSN timers are set as a multiplicity factor of the default periodic RAU/TAU timer. For example the factor may be 1.5.

The infrastructure node supports machine type communication (MTC).

Furthermore, if the UE is to use enhanced UE Discontinuous Reception, eDRX, a paging request is sent from the MME/SGSN to a network interface node.

In a further embodiment, a method is provided in an infrastructure node, in a wireless communication network, for handling power save functionality, the method comprising steps of receiving from a user equipment an indication of maximum acceptable response time for an application, setting relevant Mobility management entity/Serving GPRS support node, MME/SGSN, parameters and timers accordingly, transmitting an instruction to the UE with information about which power saving function(s) to be used, and wherein the parameters/timers are set in such a way that the maximum response time is not exceeded if power saving functions are active.

In some embodiments, the indication of maximum acceptable response time for an application is included in an EPS/GPRS Mobility management, EMM/GMM, Non-Access Stratum, NAS, request.

If the UE is to use power saving mode, PSM, the extended periodic timer parameter is used to convey the maximum response time.

If the UE is to use enhanced UE Discontinuous Reception, eDRX, the eDRX parameter is used for conveying the maximum response time. The method further comprises a step of sending a paging request from the MME/SGSN to a network interface node.

The parameter for maximum response time is available in at least one of Attach request, Non-Access Stratum. NAS, response, or in Tracking/Routing Area Update, TAU/RAU, requests.

Yet another embodiment is shown: a user equipment (UE) device in a wireless communication network. The UE comprises a processing unit, a storage unit, and a communication unit. The UE is arranged to operate in the processing unit instruction sets stored in the storage unit for transmitting and receiving data and control traffic using the communication unit and is further arranged to receive via the communication unit an indication from an application server (125) related to maximum acceptable response time. The UE is further arranged to transmit via the communication unit an indication of the maximum acceptable response time to an infrastructure node. Also the UE is arranged to receive, via the communication unit, from the infrastructure node an indication of what type of power save function to use in relation to the maximum acceptable response time, and is arranged to use the indicated type of power save function in the UE.

The processing unit may further comprise a synchronizing module for synchronizing maximum acceptable response time and power save functions with the infrastructure node, a power saving module for handling power save functions, and an operation module for handling of application operations.

The UE supports machine type communication, MTC.

There is a method performed in the user equipment (UE) device in the wireless communication network. The method comprises steps of receiving an indication, from an application server, related to maximum acceptable response time, transmitting an indication of the maximum acceptable response time to an infrastructure node, receiving from the infrastructure node an indication of what type of power save function to use in relation to the maximum acceptable response time and using the indicated type of power save function.

In some embodiments, the indication of maximum acceptable response time for an application is transmitted using an EPS/GPRS Mobility management, EMM/GMM, Non-Access Stratum, NAS, request when transmitting to the infrastructure node.

With the term user equipment, UE, is meant a terminal, a mobile phone, a smart phone, a laptop, a PC, a sensor, a manufacturing machine, a vending machine, an ATM, a pay terminal (Point of Sale, PoS, terminal), vehicle, boat, aircraft, or any other type of equipment with wireless connectivity feature(s) that operate together with a user or without a user.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent embodiments should be apparent for the person skilled in the art.

ABBREVIATIONS

3GPP $3^{rd}$ Generation Partnership Project
AP Access point
DM Discovery mode
D2D Device-to-device
M2M Machine-to-machine
MTC Machine Type Communication
DMRS Dedicated modulation reference signal
MCS Modulation and coding scheme
RB Resource block
ECM EPS Connection management
EMM EPS Mobility Management
EPS Evolved Packet System
GMM GSM/GPRS Mobility Management
NAS Non-Access Stratum
GPS Global Positioning System
LTE Long Term Evolution
MME Mobility Management Entity
OFDM Orthogonal Frequency Division Multiplexing
PLMN Public Land Mobile Network (PLMN)
PRB Physical Resource Block
E-UTRA(N) Evolution UMTS Terrestrial Radio Access (Network)
MPR Maximum power reduction
A-MPR Additional MPR
WCDMA Wide band code division multiple access
UE User Equipment
UMTS Universal Mobile Telecommunications System PRACH Physical Random Access Channel
RACH Random Access Channel
RAR Random Access Response
PUCCH Physical Uplink Control CHannel
PUSCH Physical uplink shared channel
PDSCH Physical downlink shared channel
RRC Radio Resource Control
PCell Primary Cell
PCC Policy and Charging Control
TAU Tracking Area Update
RAU Routing Area Update
M2M Machine-to-Machine
MO Mobile Originated
MTC Machine-Type Communications
SDDTE Small Data and Device Triggering Enhancements
SDT Small Data Transmission
HSS Home Subscriber Server
IMSI International Mobile Subscriber Identity
APN Access Point Name
IMEI International Mobile station Equipment Identities
TAC Type Allocation Code

REFERENCES

[1] 3GPP TR 23.709 V0.2.0 (2014-11) (Chapters 4.2, 4.2.1 & 4.2.2)
[2] 3GPP TR 23.887 V12.0.0 (2013-12); (Ch 7.1.3.1)

The invention claimed is:

1. An infrastructure node for handling communication in a wireless communication network, the infrastructure node comprising:
    a processing unit;
    a storage unit; and
    a communications unit;
    wherein the processing unit is arranged to execute instructions sets stored in the storage unit for
    receiving from a user equipment (UE) an indication of maximum acceptable response time for an application;
    deciding, based on the indication of maximum acceptable response time for the application, which power saving function(s) to use out of a plurality of possible power saving functions, wherein the deciding comprises comparing the indication of maximum acceptable response time to a threshold value and basing the deciding on an outcome of the comparing, and wherein the plurality of possible power saving functions includes a first power saving function having periodically spaced wake-up intervals, and a second power saving function that does not have predefined periodically spaced wake-up intervals;
    setting Mobility Management Entity/Serving General Packet Radio Service (GPRS) Support Node (MME/SGSN) parameters and timers based at least in part on parameter values received from the UE, wherein the parameters/timers are set in such a way that the maximum response time is not exceeded if power saving functions are active; and
    sending from the node an instruction to the UE about which power saving function(s) the UE should use.

2. The node according to claim 1, wherein the indication of maximum acceptable response time for an application is included in an Evolved Packet System/General Packet Radio Service (EPS/GPRS) Mobility management (EMM/GMM) Non-Access Stratum (NAS) request.

3. The node according to claim 1, wherein if the UE is to use power saving mode (PSM), an extended periodic timer parameter is used to convey the maximum response time.

4. The node according to claim 1, wherein if the UE is to use enhanced UE Discontinuous Reception (eDRX), an eDRX parameter is used for conveying the maximum response time.

5. The node according to claim 1, wherein the parameter for maximum response time is available in at least one of Attach request, Non-Access Stratum (NAS) response, or in Tracking/Routing Area Update (TAU/RAU) requests.

6. The node according to claim 1, wherein the MME/SGSN timers are set as a multiplicity factor of a default periodic Routing/Tracking Area Update, RAU/TAU, timer.

7. The node according to claim 6, wherein the factor is 1.5.

8. The node according to claim 1, wherein if the UE is to use enhanced UE Discontinuous Reception (eDRX), a paging request is sent from the MME/SGSN to a network interface node.

9. The node according to claim 1, wherein the node is supporting machine type communication (MTC).

10. A method, in an infrastructure node in a wireless communication network, for handling power save functionality, the method comprising the steps of:
    receiving from a user equipment (UE) an indication of maximum acceptable response time for an application;
    deciding, based on the indication of maximum acceptable response time for the application, which power saving function(s) to use out of a plurality of possible power saving functions, wherein the deciding comprises comparing the indication of maximum acceptable response time to a threshold value and basing the deciding on an outcome of the comparing, and wherein the plurality of possible power saving functions includes a first power saving function having periodically spaced wake-up intervals, and a second power saving function that does not have predefined periodically spaced wake-up intervals;
    setting Mobility management entity/Serving General Packet Radio Service (GPRS) support node (MME/SGSN) parameters and timers based at least in part on parameter values received from the UE; and
    transmitting an instruction to the UE with information about which power saving function(s) to use,
    wherein the parameters/timers are set in such a way that the maximum response time is not exceeded if power saving functions are active.

11. The method according to claim 10, wherein the indication of maximum acceptable response time for an application is included in an Evolved Packet System/General Packet Radio Service (EPS/GPRS) Mobility management (EMM/GMM) Non-Access Stratum (NAS) request.

12. The method according to claim 10, wherein if the UE is to use power saving mode (PSM), an extended periodic timer parameter is used to convey the maximum response time.

13. The method according to claim 10, wherein if the UE is to use enhanced UE Discontinuous Reception (eDRX), an eDRX parameter is used for conveying the maximum response time.

14. The method according to claim 13, the method further comprising a step of sending a paging request from the MME/SGSN to a network interface node.

15. The method according to claim 10, wherein the parameter for maximum response time is available in at least one of Attach request, Non-Access Stratum (NAS) response, or in Tracking/Routing Area Update (TAU/RAU) requests.

* * * * *